US007434484B2

(12) United States Patent
Belgardt

(10) Patent No.: US 7,434,484 B2
(45) Date of Patent: Oct. 14, 2008

(54) PIPETTING DEVICE WITH AN EJECTION DEVICE FOR PIPETTE TIPS

(75) Inventor: Herbert Belgardt, Hamburg (DE)

(73) Assignee: Eppendorf AG, Hamburg (DE)

(*) Notice: Subject to any disclaimer, the term of this patent is extended or adjusted under 35 U.S.C. 154(b) by 35 days.

(21) Appl. No.: 11/038,837

(22) Filed: Jan. 20, 2005

(65) Prior Publication Data

US 2005/0155439 A1 Jul. 21, 2005

(30) Foreign Application Priority Data

Jan. 21, 2004 (DE) ....................... 10 2004 003 433

(51) Int. Cl.
*G01N 1/00* (2006.01)

(52) U.S. Cl. .................................................. 73/864.14

(58) Field of Classification Search .............. 73/864.14, 73/864.13, 864.16, 864.17, 864.18; 422/100
See application file for complete search history.

(56) References Cited

U.S. PATENT DOCUMENTS

| | | | | |
|---|---|---|---|---|
| 3,991,617 | A | 11/1976 | d'Autry | 73/425.4 |
| 4,009,611 | A | 3/1977 | Koffer et al. | 73/425.6 |
| 4,154,108 | A * | 5/1979 | Vollinger et al. | 73/864.13 |
| 4,187,724 | A | 2/1980 | Citrin | 73/425.4 |
| RE32,210 | E | 7/1986 | d'Autry | 73/864.14 |
| 4,824,641 | A | 4/1989 | Williams | 422/100 |
| 5,013,529 | A | 5/1991 | Itoh | 422/100 |
| 5,021,217 | A * | 6/1991 | Oshikubo | 422/100 |
| 5,104,624 | A * | 4/1992 | Labriola | 422/100 |
| 5,435,197 | A | 7/1995 | Telimaa et al. | 78/864 |
| 5,614,153 | A | 3/1997 | Homberg | 422/100 |
| 5,700,959 | A * | 12/1997 | Homberg | 73/864.16 |
| 6,168,761 | B1 | 1/2001 | Kelly et al. | 422/100 |
| 6,197,259 | B1 | 3/2001 | Kelly et al. | 422/100 |
| 6,324,925 | B1 | 12/2001 | Suovaniemi et al. | 73/864.14 |
| 6,428,750 | B1 * | 8/2002 | Rainin et al. | 422/100 |
| 6,499,363 | B1 * | 12/2002 | Morimoto et al. | 73/864.01 |
| 6,532,837 | B1 | 3/2003 | Magussen, Jr. et al. | 73/864.14 |
| 6,737,023 | B1 | 5/2004 | Kelly et al. | 422/100 |
| 6,749,818 | B2 | 6/2004 | Cronenberg et al. | 422/100 |
| 6,833,114 | B1 | 12/2004 | Christen et al. | 422/100 |
| 6,871,557 | B2 | 3/2005 | Magnussen, Jr. et al. | 73/864.01 |
| 6,967,004 | B2 | 11/2005 | Rainin et al. | 422/100 |
| 6,977,062 | B2 | 12/2005 | Cronenberg | 422/100 |

(Continued)

FOREIGN PATENT DOCUMENTS

| | | |
|---|---|---|
| DE | 2711124 | 9/1978 |

(Continued)

*Primary Examiner*—Robert R Raevis
(74) *Attorney, Agent, or Firm*—Vidas, Arrett & Steinkraus, P.A.

(57) ABSTRACT

Pipetting device with a base body, at least one attachment protruding from the base body mounted axially movably on the base body for mounting a pipette tip, a spring via which the attachment is supported on the base, a stop associated with the attachment, beyond which the attachment protrudes axially, when it is not loaded toward the spring and a throw-off device to release the pipette tip from the attachment which comprises a throw-off device associated with the attachment, the attachment and throw-off device being movable relative to one another and which comprises a drive device cooperating with the throw-off device and/or the attachment for the relative movement of the throw-off device and attachment.

34 Claims, 3 Drawing Sheets

U.S. PATENT DOCUMENTS 6,994,828 B2 2/2006 Voit ........................... 422/100
7,105,130 B2 9/2006 Telimaa et al. .............. 422/100

FOREIGN PATENT DOCUMENTS

| | | |
|---|---|---|
| DE | DD282082 | 9/1990 |
| DE | 19835833 | 2/2000 |
| DE | 10135963 | 2/2003 |
| EP | 0 289 946 | 11/1988 |
| EP | 0571100 | 11/1993 |
| EP | 0992288 | 4/2000 |
| PL | 340612 | 12/2001 |
| PL | 190746 | 1/2006 |
| WO | 02/16036 | 2/2002 |
| WO | 02/089983 | 11/2002 |

* cited by examiner

PIPETTING DEVICE WITH AN EJECTION DEVICE FOR PIPETTE TIPS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a pipetting device with at least one attachment for mounting a pipette tip and an ejection device for releasing a pipette tip from the attachment.

Pipetting devices are used in particular in the laboratory for metering liquids. They are drawn into pipette tips through a tip orifice and dispensed. With air cushion pipettes a displacement device for a gas is incorporated in the pipetting device and communicatingly connected to the pipette tip by the attachment. An air cushion is displaced by means of the displacement device, so that liquid is suctioned into the pipette tip and ejected therefrom. The displacement device is generally a cylinder with a piston which can be displaced therein.

The pipette tips are releasably connected to the attachment, so that they can be exchanged after use for a fresh pipette tip. As a result contamination can be avoided during subsequent metering. Single-use pipette tips are available cheaply, made from plastics.

The attachment for fastening pipette tips is frequently a cylindrical or conical projection relative to a base body or a housing, and onto which a pipette tip with a suitable mounting opening or receiver can be clamped. This can take place without grasping the pipette tip by pressing the attachment into the mounting opening of the pipette tip which is ready in a holder.

To avoid contamination of the user, pipette devices comprise an ejection device with a drive device and a throw-off device. By actuating the drive device the throw-off device is displaced, such that it releases the pipette tip from the attachment, without it having to be grasped by the user. Frequently, the drive device has a mechanism which has to be manually actuated by means of an actuation button, in order to release the pipette tip from the attachment. Drive devices are also possible with an electromotive drive. Releasing the pipette tip from the attachment can require increased operating force, in particular with pipette tips which are rigidly clamped onto the attachment. Even with one-channel systems, i.e. pipetting devices which comprise a single attachment for a single pipette tip, this can make ejecting the pipette tip from the attachment difficult or impossible. Particularly high operating force can be required with multi-channel pipette systems which have a plurality of parallel attachments for mounting pipette tips, due to multiple tip ejection forces.

A pipette system with an axially movable throw-off device for releasing a pipette tip from an attachment, a drive device to drive the axial movements of the throw-off device and a pull-means gear, push-means gear or linkage gear transferring an axial drive movement of the drive device into an axial movement of the throw-off device is known from EP 0 992 288 A2. The force exerted by the throw-off device on the pipette tip exceeds the force exerted by the user, whereby the ejection is facilitated.

A pipetting device is known from U.S. Pat. No. 4,187,724 which comprises an attachment for mounting a pipette tip which is a portion of a shaft protruding from a body and which can be rotated in the body. The pipetting device comprises a rotary drive for the shaft. Moreover, the end of the body facing the attachment is constructed as a curved surface. The pipette tip also comprises a curved surface on the mounting end. By actuating a slider the shaft is displaced in a rotational movement, whereby a pipette tip placed on the attachment is rotated with its curved surface against the curved surface of the body, so that on further rotation of the shaft the attachment rotates relative to the pipette tip and the pipette tip is released. In these pipetting devices, the actuation of the ejection device still requires a high operating force. Furthermore, due to the curved surface, the pipette tips are special parts.

Moreover, pipetting devices and accompanying pipette tips are known which comprise an inner shoulder in order to restrict alterations in the mounting force and accordingly the operating force to actuate the ejection device. These pipette systems have the disadvantage that the use of the pipette tips is restricted frequently to the accompanying pipetting devices and vice versa. The user is restricted by this.

Proceeding from this, the object of the invention is to provide a pipetting device which reduces the operating force required to actuate the ejection device. The object is achieved by a pipetting device with the features of claim 1. Advantageous embodiments of the pipetting device are revealed in the sub-claims. The pipetting device according to the invention has a base body; at least one attachment protruding from the base body and axially movably mounted on the base body for mounting a pipette tip, a spring, via which the attachment is supported on the base body, a stop associated with the attachment beyond which the attachment protrudes axially when it is not loaded toward the spring, and an ejection device to release the pipette tip from the attachment which comprises a throw-off device associated with the attachment, the attachment and throw-off device being movable relative to one another, and which comprises a drive device cooperating with the throw-off device and/or the attachment for the relative movement of the throw-off device and the attachment.

In the pipetting device according to the invention, a pipette tip is mounted by axially inserting the attachment into the mounting aperture. The mounting force is then passed into the spring. When the mounting force exceeds a specific amount, the spring is elastically deformed until the pipette tip clamped on the attachment abuts against the stop. As soon as the pipette tip bears against the stop, it can no longer be pushed further onto the attachment. As a result the mounting force of the pipette tip is limited. The mounting force is determined by the spring characteristic of the spring, or a preload of the spring which is possibly present. The spring is designed and optionally biased, such that the pipette tip bears against the stop, precisely when it is positioned with the desired mounting force on the attachment. The mounting force is established, such that the pipette tip is positioned securely on the attachment and provides a seal. As a precisely defined mounting force is reached, it is possible to limit the mounting force to a small amount, where the required certainty of the fit and the seal is precisely given. Thus the mounting force can be markedly reduced relative to conventional pipetting devices, in which an excessive mounting force is regularly used due to unreliability during mounting. Accordingly, in the pipetting device according to the invention, the operating force required to actuate the ejection device is reduced. With manually actuatable ejection devices, stresses on the tendons and muscles of the user are reduced by reducing the operating forces. Ejection devices operated electromotively manage with lower powered motors. According to an embodiment the spring is designed and/or biased such that the attachment can be displaced to such an extent toward the stop by a defined mounting force which can be applied to the attachment by mounting a pipette tip, that the pipette tip bears against the stop.

To release the pipette tip from the attachment, the attachment and throw-off device are axially or rotatably movable relative to one another. The invention includes embodiments in which the throw-off device is arranged fixedly relative to the pipetting device and the drive device exclusively moves the attachment. Moreover, the invention includes embodiments in which the drive devices move the throw-off device and the attachment. In preferred embodiments the attachment is stationary relative to the pipetting device and the drive device only cooperates with the throw-off device, so that solely the throw-off device can be moved by means of the drive device.

BRIEF SUMMARY OF THE INVENTION

According to an embodiment the attachment is directly supported on the spring. The connection of the attachment to a displacement device connected rigidly to the base body, can result by means of a flexible connection, for example by means of a flexible hose or a telescopic tube connection. According to an embodiment, the attachment is rigidly connected to a displacement device, for example with a cylinder of a piston-cylinder-unit which is axially displaceable relative to the base body. The displacement device is then displaced with the attachment. The displacement of the displacement device can be compensated by the drive device for the displacement device. According to an embodiment, the cylinder is supported on the base body via the spring, so that the attachment is indirectly sprung via the cylinder.

According to an embodiment the spring is a coil spring extended in the axial direction of the attachment. The coil spring is preferably extended coaxially to the attachment. The coil spring can advantageously pass through the displacement device and the drive device for the displacement device.

The pipetting device can be designed with an unbiased spring. Then the spring is compressed depending on the increase in mounting force when mounting the attachment onto the pipette tip. By designing the spring and the distance for the pipette tip to bear against the stop, it is possible to establish precisely the mounting force. According to an embodiment the spring comprises a spring preload. As a result, the attachment is only axially displaced when the mounting force exceeds the force to bias the spring. As a result, the mounting force required to reach the stop is defined. Moreover, this favours particularly compact spring arrangements and short displacement distances of the attachment.

According to an embodiment the stop, against which the pipette tip abuts when mounted, is rigidly connected to the base body. According to a further embodiment, the stop can be moved axially relative to the attachment and a limiter connected rigidly to the base body is present for the axial movement of the stop toward the base body.

According to an embodiment, the stop is constructed on the throw-off device. In an embodiment of the throw-off device as a sleeve coaxial to the attachment, the stop is formed by the end of the sleeve facing the attachment.

The attachment can be secured in different ways in its axial initial position to receive a pipette tip, for example by connecting the attachment to the spring. The initial position of the attachment is then defined by the initial position of the spring unloaded by the attachment. According to an embodiment, the attachment is supported on a further stop in the direction away from the spring, and against which it is pressed by the spring. As a result, the initial position is precisely established. Furthermore, no connection is required between the attachment and the spring.

According to an embodiment the spring can be exchanged and/or a device for adjusting the spring preload is present. As a result, an adaptation of the mounting and ejection forces on differently formed and different sizes of pipette tips is possible. The field of application of the pipetting device is thereby enlarged.

According to an embodiment the drive device can be actuated against the effect of a further spring supported on the one hand on a movable part of the drive device and on the other hand on the base body. As a result, the drive device automatically returns into its initial position after actuation. For a defined initial position, a limiter fixed relative to the base body for the movement of the throw-off device or the drive device is, for example, present. At the same time, this can be the limiter for the axial movement of the stop toward the base body.

According to an embodiment the base body comprises a carrier or frame. According to an embodiment the base body comprises a housing, optionally with a carrier or frame contained therein.

According to an embodiment, the pipetting device is a hand-held device and/or a stationary device and/or an electrically driven device and/or a (semi) automatic machine. In the embodiments as a hand-held device the pipetting device is manually taken to the point where samples are taken and dispensed and the suctioning and dispensing of liquid and the actuation of the ejection device controlled manually. The drive devices for the displacement device and/or the throw-off device are of mechanical and/or electromechanical design. The latter also applies to the design of the pipetting devices as stationary devices. When designing the pipetting device as a (semi) automatic machine, all functions or a portion of the functions of the pipetting devices (suctioning and dispensing liquid, movement of the pipetting devices into positions for receiving and dispensing liquid and pipette tips, receiving and dispensing of pipette tips) are carried out automatically.

According to an embodiment, the pipetting device comprises a row of parallel attachments to receive pipette tips. In this case it is a multi-channel pipette system. Due to the multiple tip ejection forces, the use of the invention is particularly advantageous.

According to an embodiment each attachment is supported on the base body via a special spring.

According to an embodiment a common throw-off device is associated with the attachments.

According to an embodiment the pipetting device according to the invention has a displacement device with a displacement chamber with a displaceable limiter, an attachment for connecting to a pipette tip and a connection channel between the displacement chamber and the free end of the attachment, a drive device for driving the displaceable limiter of the displacement device with a drive member which cooperates releasably with the displaceable limiter, and a bayonet connection between the drive device and the displacement device which can be created by producing the cooperation between the drive member and the displaceable limiter and can be released by releasing the cooperation between the drive member and the displaceable limiter.

The displacement device and the drive device to drive the displaceable limiter of the pipetting device can be easily connected to one another by being pushed together along a longitudinal axis of the bayonet connection and rotating about the longitudinal axis of the bayonet connection and can be separated from one another in the reverse manner. When creating the bayonet connection the cooperation between the drive member and the displaceable limiter is simultaneously produced without it requiring particular further actions therefor. When releasing the bayonet connection, the cooperation is released without particular further actions. The invention allows a particularly simple, rapid and secure connection and separation of the displacement device and the drive device to drive the displaceable limiter, for example during assembly before autoclaving or other cleaning of the lower part, before exchanging the lower part for the purpose of altering the working area, repairs, etc. The bayonet connection is not particularly susceptible to faults. These advantages are in particular effective when manually and automatically connecting and separating the displacement device and the drive device for driving the displaceable limiter. The latter, for example, with automatic assembly or a workstation with automatic tool exchange.

The drive device for driving the displaceable limiter can be designed in different ways. It makes use of technical means to displace the drive member, such that it displaces the displaceable limiter of the displacement device. To this end, the drive member carries out, for example, a linear movement. Accordingly, the drive device comprises a linear drive to drive the displaceable limiter. In this connection there is, for example, a lifting rod which can be manually actuated directly by actuating a button or a lifting rod which is linearly displaceable via an electric drive motor and a gear mechanism. A pneumatically or hydraulically operated pressure medium cylinder can also be considered as the drive for the lifting rod which is actuated via a pneumatic or hydraulic control mechanism and a pressure medium reservoir. If the drive member does not carry out a linear movement but a three-dimensional feed motion, the drive device comprises a corresponding drive to drive the displaceable limiter.

The drive device for driving the displaceable limiter preferably comprises a housing in which the drive and the drive member are arranged.

According to an embodiment, the drive member is a lifting rod of the drive device, displaceable parallel to the longitudinal axis of the bayonet connection and the displacement device comprises a contact surface connected to the limiter, oriented transversely to the lifting rod and which is pressed by a lift spring against the end of the lifting rod. In this embodiment the cooperation between the drive member and the displaceable limiter is automatically produced when the bayonet connection is created and automatically released when the bayonet connection is released.

According to an embodiment the contact surface is constructed on a pressure piece connected to the displaceable limiter via a rod and the lift spring is designed as a coil spring which at one end is supported on the pressure piece and at the other end on the displacement chamber.

The bayonet connection can be designed in different ways. Included in the invention in particular is the design of the drive device as a male part and the displacement device as a female part of the bayonet connection and vice versa. According to an embodiment the drive device has a cylindrical receiver which comprises an aperture at one end through which the cylindrical receiver is externally accessible in the axial direction which comprises at least one axially oriented longitudinal groove which is connected to an annular groove oriented in the peripheral direction of the cylindrical receiver and the displacement device on a cylindrical portion comprises at least one outwardly protruding projection, the cylindrical portion able to be inserted in the axial direction of the cylindrical receiver through the aperture into the receiver and with the projection into the longitudinal groove and can be screwed with the projection into the annular groove. In this embodiment the drive device is the female part and the displacement device the male part.

According to an embodiment the annular groove comprises, at a distance from the longitudinal groove, a limiting wall extended in the axial direction of the receiver, as far as which the projection can be rotated. Reaching the limiter indicates to the user that the bayonet connection has been established.

According to an embodiment, the annular groove is connected, at a distance from the longitudinal groove, to a longitudinal groove portion extending parallel thereto, which ends at a distance from the aperture. By engaging the projection into the longitudinal groove portion the reliability of the bayonet connection is effected.

According to an embodiment, the annular groove has a limiting wall extending in a ramp-like manner of which the distance from the aperture increases with the increasing distance from the longitudinal groove. The ramp-like path of the limiting wall facilitates finding the connection position and the separation of the displacement device from the drive device.

According to an embodiment the longitudinal groove, the annular groove and optionally the longitudinal groove portion are constructed in a cylindrical coupling piece which forms the receiver of the drive device and is fastened therein. As a result the manufacture, assembly and disassembly are facilitated.

According to an embodiment the drive device comprises a spring which presses against the displacement device connected to the drive device via the bayonet connection. As a result the bayonet connection is secured.

According to an embodiment, the spring is arranged on a further aperture of the receiver which is positioned opposite the aperture for axially inserting the displacement device. The displacement device and the spring act upon one another through this aperture. According to a further embodiment, the spring is a coil spring which is supported on an inner front face of the coupling piece.

According to an embodiment the longitudinal groove and/or the annular groove and/or the longitudinal groove portion are open toward the further aperture.

According to an embodiment, the displacement device is a piston-cylinder-unit with a cylinder and a piston displaceable therein and the piston comprises the displaceable limiter. Other displacement devices are also included in the invention, for example a displacement chamber with a resilient wall forming the displaceable limiter. A piston-cylinder-unit is, for example actuated by a linear drive device. A corresponding actuation is possible in a displacement chamber with a resilient wall. The latter can also however be controlled via a drive device with a three-dimensional drive motion. Thus it is possible, for example, to control the resilient wall externally by acting upon a hydraulic or pneumatic pressure means.

According to an embodiment the attachment is aligned coaxially to the longitudinal axis of the bayonet connection. According to a further embodiment the attachment is rigidly connected to the displacement device.

According to an embodiment the pipetting device has an ejection device for ejecting a pipette tip from the attachment which comprises an ejection drive arranged on the drive device, a throw-off device arranged on the displacement device and a releasable axial clamping connection between the ejection drive and the throw-off device oriented in the direction of the longitudinal axis of the bayonet connection. The clamping connection can be produced at the same time as the establishment of the bayonet connection at the stage of the displacement device and the drive device being axially pushed together and can be released in the reverse direction.

According to an embodiment the ejection drive comprises an ejection rod protruding from the drive device parallel to the bayonet connection and the throw-off device comprises an axial bore parallel to the attachment and with which the ejection rod has an interference fit.

According to an embodiment, the throw-off device is carried on the displacement device.

According to an embodiment, the throw-off device is a sleeve carried on the displacement device.

According to an embodiment, the pipetting device is a hand-held device and/or a stationary device and/or an electrically driven device and/or a (semi) automatic machine. In the embodiments as a hand-held device the pipetting device is manually taken to the point where samples are taken and dispensed and the suctioning and dispensing of liquid and the actuation of the ejection device controlled manually. The drive devices for the displacement device and/or the throw-off device are of mechanical and/or electromechanical design. The latter also applies to the design of the pipetting devices as stationary device. When designing the pipetting device as a (semi) automatic machine all functions or a portion of the functions of the pipetting devices (suctioning and dispensing liquid, movement of the pipetting devices into positions for receiving and dispensing liquid and pipette tips, receiving and dispensing of pipette tips) are carried out automatically.

According to an embodiment, the pipetting device comprises a row of parallel attachments to receive pipette tips. In this case it is a multi-channel pipette system. A special or common displacement device is associated with each attachment of the pipetting device which is connected to the drive device via a bayonet connection. In addition, there can be a common drive device for all the displacement devices.

BRIEF DESCRIPTION OF SEVERAL VIEWS OF THE DRAWINGS

The invention will be described in more detail hereinafter with reference to the accompanying drawings of embodiments, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The terms ‘above’, ‘below’, ‘horizontally’, ‘vertically’, ‘front’ and ‘rear’ refer to the alignment of the pipetting device according to the drawings. In this connection it refers to alignments of the pipetting devices in which the pipette tip is arranged with its tip orifice below, in order to draw in liquid from a container located below the pipetting device and to dispense it into such a container.

Figure 1:
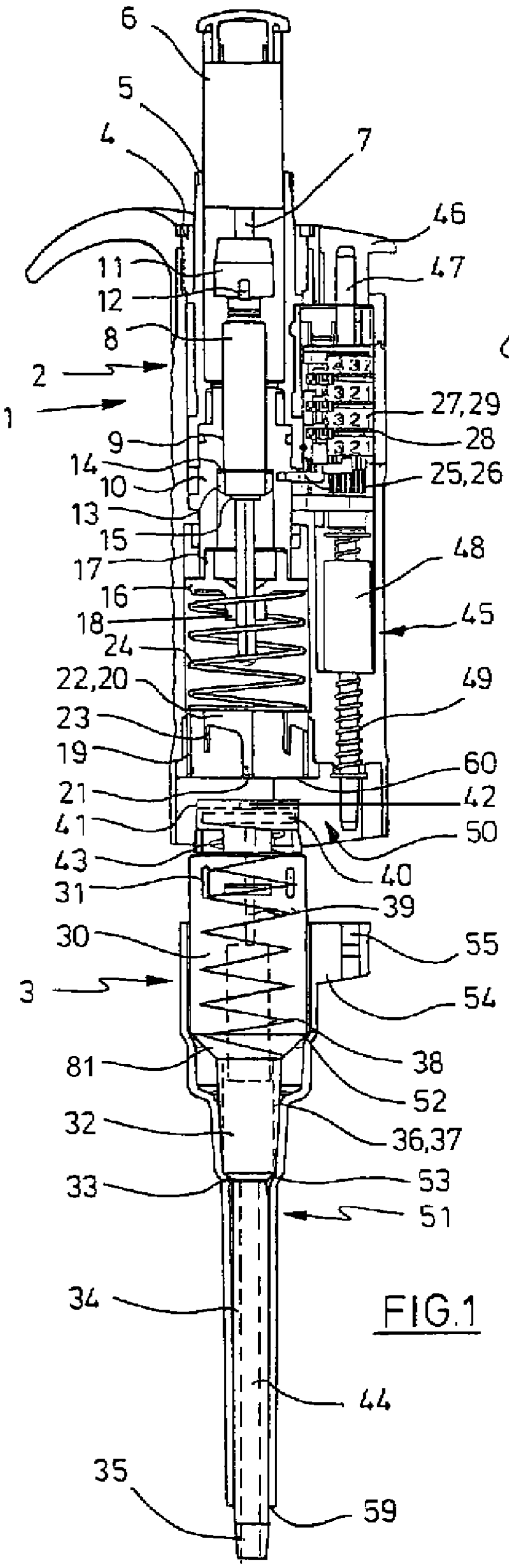
FIG. 1 is a hand-operated pipetting device with separate piston-cylinder-unit and throw-off device in longitudinal section.
Figure 2:
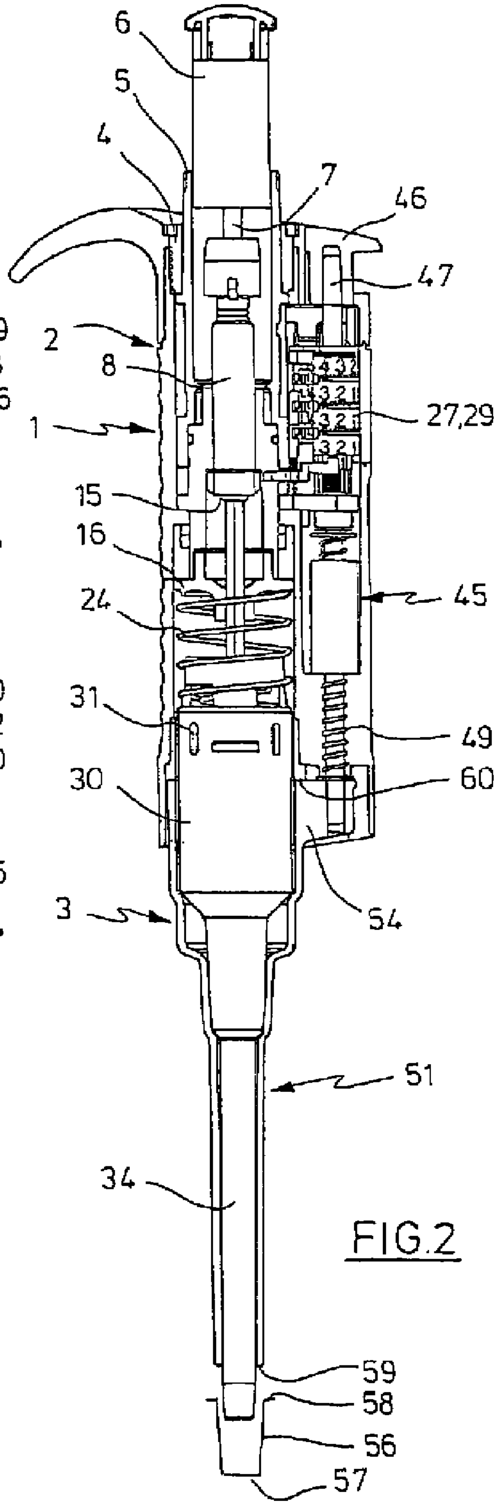
FIG. 2 is the same pipetting device with attached piston-cylinder-unit and throw-off device in longitudinal section.

The pipetting device according to FIGS. 1 and 2 has an elongate housing 1 formed as a grip with a housing upper part 2 and a housing lower part 3. The housing upper part 2 with all the parts contained therein forms a drive device and the housing lower part 3 with all the parts contained therein forms a displacement device. The housing upper part 2 forms a base body. It has a screw cap 4 above. An adjustable sleeve 5 protrudes upwardly therefrom. The adjustable sleeve 5 is axially fixedly and rotatably mounted in the housing upper part 2.

In the adjustable sleeve 5 a push button 6 is arranged which protrudes even further upwardly.

The push button 6 is connected to a lifting rod 7 through which a spindle 8 is passed in the housing upper part 2. The spindle 8 is screwed into an internal thread 9 of a bearing body 10 fixed in the housing upper part 2.

Above, the spindle 8 comprises a tappet 11 connected rotationally fixedly thereto. The tappet 11 has on the periphery two diametrically opposing radial projections 12. The radial projections 12 engage in axially extending grooves—not shown—of the adjustable sleeve 5.

Below, the spindle 8 has an end stop 13 in the form of radially outwardly protruding ribs. In the position shown, the end stop 13 is located a small distance below a shoulder 14 of the bearing body 10, with which it cooperates.

The lifting rod 7 has a flange 15 which bears against the spindle 8 below in the position shown.

At the lower end of the bearing body 10 a spring retainer 16 is arranged, which engages in the bearing body 10 with a collar 17. Below, the spring retainer 16 has an axially protruding sleeve-shaped bearing portion 18 through which the lifting rod 7 is passed.

Moreover, the pipetting device comprises a spring, not shown, which presses the lifting rod 7 upwardly, so that the flange 15 bears against the lower face of the spindle 8. For example, a coil spring is arranged between the flange 15 and the spring retainer 16.

At a distance below the spring retainer 16 a coupling piece 19 is fastened in the housing. This has a plurality of pockets 20 inside. These have a longitudinal groove 21 extended axially over the entire length of the coupling piece 19. Moreover, they have on the upper end of the coupling piece 19 an annular groove 22 extended over a small part of the periphery of the coupling piece 19. Below, it has a limiting wall extending in a ramp-like manner at a distance from the upper end of the coupling piece 19, which from the longitudinal groove 21 increasingly approaches the upper end of the coupling piece 19. Finally, the pockets 20 have at the other end of the annular groove 22 a short axial longitudinal groove portion 23 which ends in the coupling piece 19 at a distance from the upper end of the coupling piece 19.

Between the spring retainer 16 and the coupling piece 19 a spring 24 is arranged under preload which is designed as a coil spring.

The adjustable sleeve 5 has on its periphery a sprocket 25 which cooperates with a gear 26 which drives a counter 27 with a plurality of counter wheels 29 arranged over one another on an axis 28. The counter wheels 29 are respectively numbered from 0 to 9. The lower counter wheel 29 is driven by the gear wheel 26. The counter wheels 29 arranged thereover are respectively rotated further by a number when the counter wheel 29 arranged thereunder moves from 9 to 0.

The housing lower part 3 can be releasably connected to the housing upper part 2. To this end the housing lower part 3 comprises on the casing of an upper, cylindrical portion 30 a plurality of outwardly protruding ribs 31 which extend in the axial direction of the cylindrical portion 30.

The housing lower part 3 has a plurality of conical portions 81, 32-33 of varying lengths and taper, below the cylindrical portion 30, which are revealed in the drawings. The conical portion 33 is connected below to a long, slightly conical attachment 34 for mounting a pipette tip. This again has a short, more conical mounting end 35 below.

The housing lower part 3 houses a displacement device in the form of a piston-cylinder-unit 36. This has a cylinder 37 arranged in the conical portion 32, and in which a piston 38 dips. The piston 38 is connected above to a pressure piece 40 via a piston rod 39. The piston 38 forms a displaceable limiter of the cylinder 37.

Above the pressure piece 40 the housing lower part 3 has a piston holder 41 which spans the cylindrical portion 30 above. The piston holder 41 has above a central through passage 42, through which a lower portion of the lifting rod 7 can be axially passed. Between the pressure piece 40 and the conical portion 81 a lift spring 43 is arranged which is designed as a coil spring. The piston 38 and the piston rod 39 are passed through the life spring 43.

The lift spring 43 is biased and presses the pressure piece 40 against the piston holder 41, so that the piston 38 is pulled out to a maximum extent from the cylinder 37.

A connection channel 44 extends through the attachment 34 and connects the cylinder 37 to an orifice in the mounting end 35. Moreover, the pipetting device has an ejection device 45. The ejection device 45 has an actuation button 46 in the housing upper part 2 in addition to the push button 6. The actuation button 46 is connected to an ejection rod 47 which extends parallel to the lifting rod 7 through the housing upper part 2.

A gear mechanism 48 is incorporated in the ejection rod 47. The gear mechanism 48 converts an axial actuation stroke of the actuation button 46 into a smaller drive stroke with increased force. Examples of suitable gear mechanisms 48 include a pull-means gear mechanism, a push-means piston gear mechanism, a push-means bellows gear mechanism and a linkage gear mechanism are disclosed in EP 0 992 288 A, hereby incorporated by reference.

The ejection rod 47 is supported in the housing upper part 2 via a further coil spring 49, so that the actuation button 46 is pressed into the shown initial position into which it can be pressed against the effect of the further coil spring 49.

The lower end of the ejection rod 47 protrudes into a receiver 50 at the lower end of the housing upper part 2.

The ejection device 45 has an ejection sleeve 51 on the housing lower part 3. This is carried on the cylindrical portion 30, the conical portion 32 and the attachment 34. Accordingly, the contour of the ejection sleeve 51 is similar to the contours of the aforementioned portions of the housing lower part 3. In this connection the ejection sleeve 51 has inner steps 52, 53 which upwardly limit the pushing up of the ejection sleeve 51, as they bear against conical portions 81, 33 of the housing lower part 3.

Moreover, the ejection sleeve 51 has a lateral projection 54 on the upper edge which comprises an axial bore 55 for pressing in the lower end of the ejection rod 47.

The pipetting device can be used in the following manner:

The housing upper part 2 and the housing lower part 3 can be connected by axially inserting and rotating the lower part 3 in the coupling piece 19. As a result, a bayonet connection is established. Then the ribs 31 are pushed into the longitudinal grooves 21, rotated through the annular grooves 22 and pushed into the short longitudinal groove portions 23. In this connection, the spring 24 presses against the upper edge of the cylindrical portion 30, whereby the housing lower part 3 is fixed in its fastening position, in which the ribs 31 bear against the lower ends of the longitudinal groove portions 23 which form a stop. Moreover, the ejection sleeve 51 with the bore 55 is pressed onto the lower region of the ejection rod 47. The housing upper part 2 and the housing lower part 3 can be disassembled in the reverse manner.

After connecting the housing upper part 2 and the housing lower part 3 the lifting rod 7 engages through the through passage 42 and bears with its lower end against the pressure piece 40.

To adjust a volume to be pipetted, the adjustable sleeve 5 is rotated until the counter 27 indicates the desired volume. When rotating the adjustable sleeve 5 the tappet 11 is rotated therewith due to the radial projections 12. As a result the spindle 8 rotates in the internal thread 9 and is displaced axially in the housing upper part 2 by driving the flange 15 and therefore the lifting rod 7. The radial projections 12 are therefore axially displaced along the grooves on the inner face of the adjustable sleeve 5. As a result, the stroke of the lifting rod 7 is altered, which can take place during actuation of the push button 6.

Moreover, on the lower end of the attachment 34 a pipette tip 56 is clamped. The pipette tip 56 has a lower tip orifice 57 for suctioning and dispensing liquid.

When mounting the pipette tip 56 on the attachment 34, the mounting force increases as it is mounted further. If the mounting force exceeds the force with which the spring 24 is biased, the attachment 34 and thus the entire housing lower part 3 is pressed upwardly against the effect of the spring 24. When the upper edge 58 of the pipette tip 56 presses the lower edge forming a stop 59 of the ejection sleeve 51, a further raising of the housing lower part 3 is prevented, as the ejection sleeve 51 bears against a limiter 60 in the receiver 50 of the housing upper part 2 above. The mounting force and thus the ejection force required for ejection are thus limited to a specific value.

For pipetting, the push button 6 is pressed down, so that the piston 38 forces air out of the cylinder 37. Then the pipette tip 56 is dipped with its lower tip orifice 57 into the liquid to be pipetted. Then the push button 6 is released and the lifting rod 7 returns into its initial position under the action of the spring. The piston 38 also returns into its initial position under the action of the spring 43. Then the piston 38 suctions liquid through the lower tip orifice 57 into the pipette tip 56.

Afterwards, the lower tip orifice 57 of the pipetting device is aligned with a dispensing point. The liquid contained in the pipette tip 56 is dispensed by pressing in the push button 6, further dipping of the piston 38 into the cylinder 37 and pressing air out through the connection channel 44. After releasing the actuation button 6, the lifting rod 7 and the piston 38 return again to the initial position by spring force.

To eject the pipette tip 56, the actuation button 46 is pressed. As a result the ejection sleeve 51 moves downwardly and pushes the pipette tip 56 away from the attachment 34.

Figure 3:
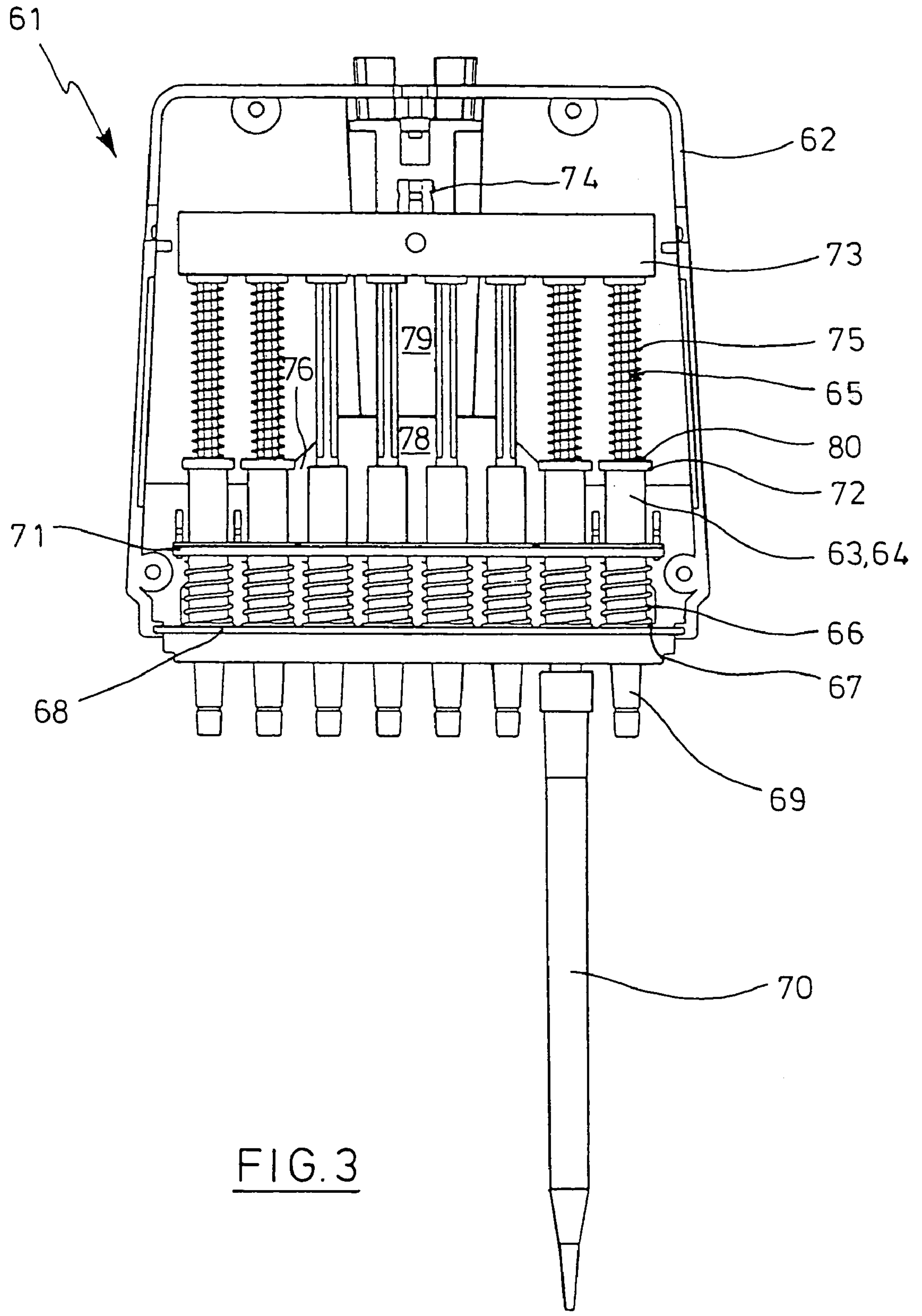
FIG. 3 is a multi-channel pipetting device in vertical section from the front.
Figure 4:
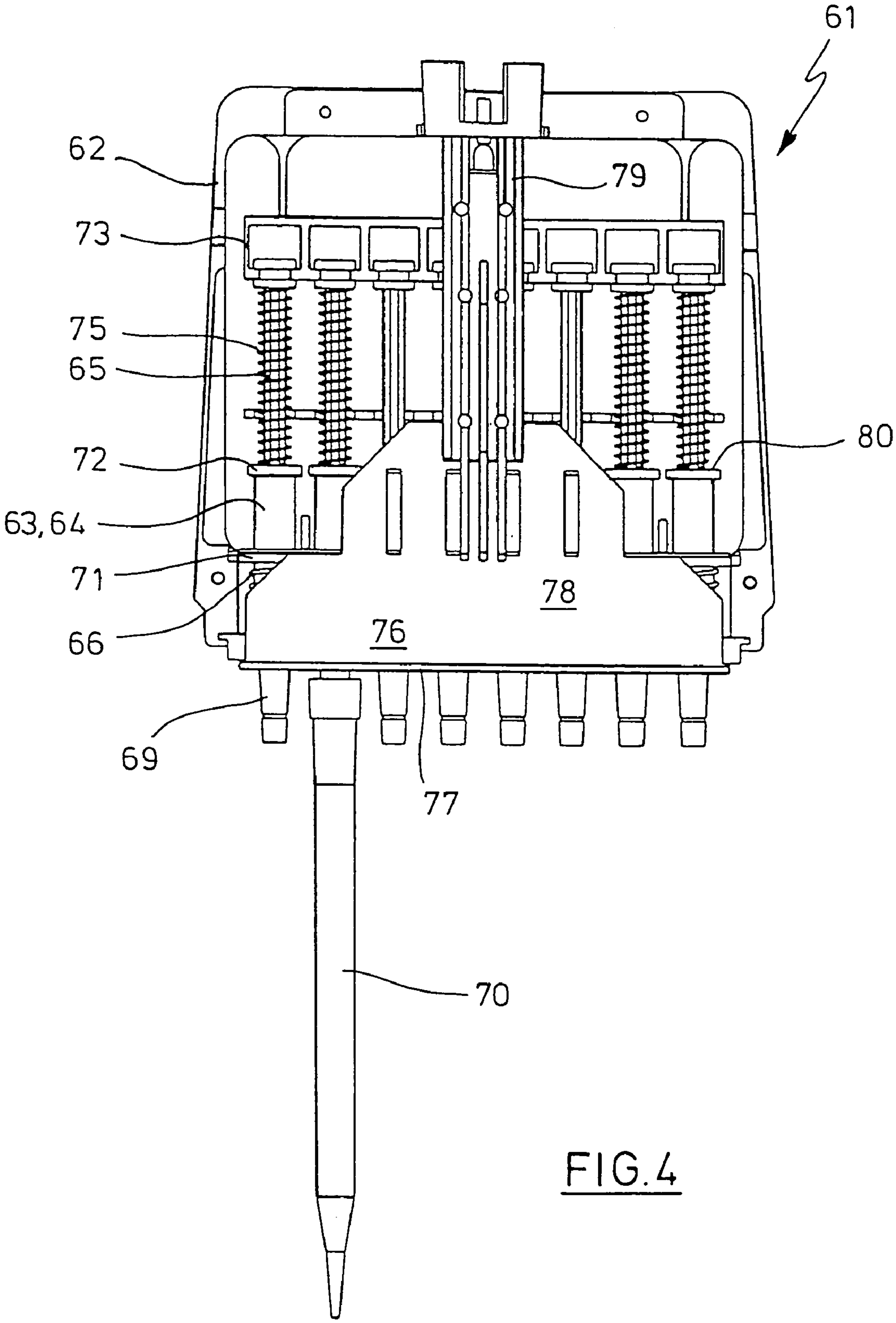
FIG. 4 is the same multi-channel pipetting device in vertical section from the rear.

According to FIGS. 3 and 4 a dispensing head 61 of a multi-channel pipetting device has a housing 62, in which eight parallel piston-cylinder-units 63 are arranged in a row. Each piston-cylinder-unit 63 has a cylinder 64 in which a piston 65 dips.

On each cylinder 64 a spring 66 designed as a coil spring is carried which bears against a peripheral projection 67 of the cylinder 64 below.

In the region of the peripheral projection 67, the cylinder 64 is guided in a guide rail 68.

Moreover, each cylinder 64 is connected below the peripheral projection 67 to a conical attachment 69 for mounting a pipette tip 70.

Above the coil spring 66 the cylinders 64 are guided through by a support plate 71 arranged fixedly in the housing 62. The springs 66 are supported on the lower face of the support plate 71.

Above, the cylinders 64 have a further peripheral projection which forms a spring bearing 72. Each spring bearing 72 is retained by a console, not shown, which protrudes inwardly from the wall of the housing 62.

All the pistons 65 are held above in a piston receiver 73 in the form of a cross rail. The piston receiver 73 has a journal 74 above to connect to a lifting rod, not shown, which leads to a drive for the pistons 65.

On all pistons 65 further springs 75 designed as coil springs are carried which are supported below on the spring bearing 72 and are supported above on the lower face of the piston receiver 73.

Finally, a throw-off device 76 in the form of an angled plate is mounted in the housing 62. This has in the lower horizontal side 77 eight holes through which the attachments 69 are passed. The vertical side 78 can be connected to an ejection rod, not shown, via a shank 79.

The pistons 65 are introduced into the cylinder 64 through a piston seal 80.

The dispensing head 61 is connected to the lifting rod and the ejection rod of a not shown drive device. When mounting pipette tips 70, the attachments 69 are moved upwardly within the housing 62, when the mounting forces exceed the forces which bias the springs 66. As soon as the pipette tips 70 bear against the throw-off device 76 with their upper edges, the further mounting movement is halted as the throw-off device 76 bears against the lower face of the guide rail 68 with the upper face of its horizontal side 77. As a result, the mounting forces and thus the forces required to eject the pipette tips 70 is restricted.

For pipetting, the pistons 65 are moved by means of the lifting rod connected to the journal 74. To eject the pipette tips 70 the shank 79 is downwardly displaced by means of the lifting rod, so that the throw-off device 76 is moved downwardly and pushes the pipette tips 70 away from the attachments 69 with its side 77.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Pipetting device with a base body (2), at least one attachment (34) protruding from the base body (2) mounted axially movably on the base body (2) to mount a pipette tip (56), at least one spring (24) via which the at least one attachment (34) is supported on the base (2), and an ejection device (45) to release the pipette tip (56) from the at least one attachment (34) which comprises a throw-off device (51) associated with the at least one attachment (34), the at least one attachment (34) and throw-off device (51) being movable relative to one another and the ejection device (45) further comprising a drive device (46, 47, 48), the drive device (46,47,48) cooperating with the throw-off device (51) and/or the at least one attachment (34) for the relative movement of the throw-off device (51) and the at least one attachment (34), the throw-off device including a stop (59) associated with the at least one attachment (34) beyond which the attachment (34) protrudes axially, when it is not loaded toward the spring (24), and against which the pipette tip (56) abuts when pushed on the at least one attachment (34).

2. Pipetting device according to claim 1, in which the at least one attachment (34) is connected fixedly to a displacement device (36).

3. Pipetting device according to claim 1, in which a displacement device (36) is supported via the at least one spring (24) on the base body (2).

4. Pipetting device according to claim 1, in which the at least one spring (24) is a coil spring extended in the axial direction of the at least one attachment (34).

5. Pipetting device according to claim 1, wherein the at least one spring (24) is a biased spring.

6. Pipetting device according to claim 1, in which the stop (59) is axially movable relative to the at least one attachment (34) and the pipetting device further comprising a limiter (60) connected rigidly to the base body (2), the limiter 60 allowing the axial movement of the stop (59) toward the base body (2).

7. Pipetting device according to claim 1, in which the stop (59) is constructed on the throw-off device (51).

8. Pipetting device according to claim 1, in which the at least one attachment (34) is supported in the direction away from the at least one spring (24) on a further stop (23), against which the at least one attachment (34) is pressed by the at least one spring (24).

9. Pipetting device according to claim 1, in which the at least one spring (24) can be exchanged and/or a device for adjusting the spring preload is present.

10. Pipetting device according to claim 1, in which the drive device (46, 47, 48) can be actuated against the effect of a further spring (49) supported on the one hand on a movable part of the drive device (46, 47, 48) and on the other hand on the base body (2).

11. Pipetting device according to claim 1, in which the base body (2) comprises a carrier and/or a frame and/or a housing.

12. Pipetting device according to claim 1, wherein the pipetting device is selected from at least one member of the group consisting of a hand-held device, a stationary device, an electrically driven device, and a semi-automatic device.

13. Pipetting device according to claim 1, the at least one attachment being a row of attachments (69), the row of attachments being parallel, each of the at least one attachments constructed to receive pipette tips (70).

14. Pipetting device according to claim 13, in which each of the attachments of the row of attachments (69) is supported by one of the at least one springs (24) on the base body (62).

15. Pipetting device according to claim 13, in which a common throw-off device (76) is associated with the row of attachments (69).

16. Pipetting device according to claim 1 with a displacement device (36), the displacement device comprising a displacement chamber (37) with a displaceable limiter (38), the at least one attachment (34) for connecting to the pipette tip (56), the at least one attachment having a free end, and a connecting channel (44), the connecting channel (44) begin between the displacement chamber (37) and the free end of the at least one attachment (34), a drive device (6, 7, 8) for driving the displaceable limiter (38) of the displacement device (36) with a drive member (7), the drive member (7) in releasable cooperation with the displaceable limiter (38), and a bayonet connection (19, 22, 30, 31), the bayonet connection being between the drive device (6, 7, 8) and the displacement device (36), the bayonet connection which established by creating cooperation between the drive member (7) and the displaceable limiter (38) and the bayonet connection can be released by releasing the cooperation between the drive member (7) and the displaceable limiter (38).

17. Pipetting device according to claim 16, in which the drive member (7) is a lifting rod of the drive device (6, 7, 8) displaceable parallel to the longitudinal axis of the bayonet connection and the displacement device (36) comprises a contact surface connected to the limiter (38), oriented transversely to the lifting rod (7), which is pressed by a lift spring (43) against the end of the lifting rod (7).

18. Pipetting device according to claim 17, in which the contact surface is constructed on a pressure piece (40) connected to the limiter (38) via a rod (39) and a lift spring (43) designed as a coil spring is supported at one end on the pressure piece (40) and at the other end on the displacement chamber (37).

19. Pipetting device according to claim 16, the drive device (6, 7, 8) having a cylindrical receiver (19) the cylindrical receiver (19) comprises at one end an aperture, through which the cylindrical receiver (19) is externally accessible in the axial direction, the cylindrical receiver (19) further comprises an axially oriented longitudinal groove (21), the axially oriented longitudinal groove (21) is connected to an annular groove (22) oriented in the peripheral direction of the cylindrical receiver (19) and the displacement device (36) comprises on one cylindrical portion (30) at least one projection (31) protruding outwardly, the cylindrical portion (30) in the axial direction of the cylindrical receiver (19) able to be inserted through the aperture in the receiver (19) and with the at least one projection (31) in the longitudinal groove (21) and can be rotated with the projection (31) into the annular groove (22).

20. Pipetting device according to claim 16, in which an annular groove (22) at a distance from a longitudinal groove (21) comprises a limiting wall extended in the axial direction of the receiver (19), as far as which the at least one projection (31) can be rotated.

21. Pipetting device according to claim 19, in which the annular groove (22) at a distance from the longitudinal groove (21) is connected to a longitudinal groove portion (23), the longitudinal groove portion (23) extending parallel to the longitudinal groove (21) and ending at a distance from the aperture.

22. Pipetting device according to claim 19, in which the annular groove (22) comprises a limiting wall extending in a ramp-like manner whose distance from the aperture increases with increasing distance from the longitudinal groove (21).

23. Pipetting device according to claim 19, in which the longitudinal groove (21) and the annular groove (22) are constructed with a cylindrical coupling piece (19) which forms the receiver of the drive device (6, 7, 8) and is fastened therein.

24. Pipetting device according to claim 16, in which the drive device (6, 7, 8) further comprises the spring (24), the at least one spring (24) presses against the displacement device (36) connected to the drive device (6, 7, 8) via the bayonet connection (19, 22, 30, 31).

25. Pipetting device according to claim 24, in which the at least one spring (24) is arranged on a further aperture of a receiver (19), which lies opposite the aperture for axially inserting the displacement device (36).

26. Pipetting device according to claim 24, in which the at least one spring (24) is a coil spring which is supported on an inner front face of a coupling piece (19).

27. Pipetting device according to claim 25, in which the longitudinal groove (21) and/or the annular groove (22) and/or the longitudinal groove portion (23) are opened toward the further aperture.

28. Pipetting device according to claim 16, in which the displacement device (36) comprises a piston-cylinder-unit with a cylinder (37) and a piston (38) displaceable therein and the piston (38) comprises the displaceable limiter.

29. Pipetting device according to claim 16, in which the at least one attachment (34) is aligned coaxially to the longitudinal axis of the bayonet connection (19, 22, 30, 31).

30. Pipetting device according to claim 16, in which the at least one attachment (34) is rigidly connected to the displacement chamber (37).

31. Pipetting device according to claim 16, the drive device (46, 47, 48) being an ejection drive, the ejection drive (46,47, 48) arranged on the drive device (6, 7, 8), the throw-off device (51) arranged on the displacement device (36) and the throw-off device (51) further comprising a releasably axial clamping connection (47, 55) oriented in the direction of the longitudinal axis of the bayonet connection (19, 22, 30, 31) between the ejection drive (45) and the throw-off device (51).

32. Pipetting device according to claim 31, the releasably axial clamping connection (47,55) comprising an ejection rod (47) and an axial bore (55), the ejection rod (47) protruding from the drive device (6,7,8) parallel to the bayonet connection (19,22,30,31), the axial bore (55) forming a part of the throw-off device (51), the axial bore (55) being parallel to the at least one attachment (34), the axial bore (55) having an interference fit with the ejection rod (47).

33. Pipetting device according to claim 32, in which the throw-off device (51) is carried on the displacement device (36).

34. Pipetting device according to claims 16, in which the throw-off device (51) is a sleeve carried on the displacement device (36).

* * * * *